Patented Aug. 22, 1939

2,170,431

UNITED STATES PATENT OFFICE 2,170,431

ALLOY

Hans Heinrich Schwarzkopf, Reutte, Tyrol, Austria, assignor to N. V. Molybdenum Company, Reutte, Tyrol, Austria No Drawing. Original application September 12, 1935, Serial No. 40,302. Divided and this application November 13, 1937, Serial No. 174,352. In Germany September 12, 1934

3 Claims. (Cl. 75—153)

This invention relates to an alloy and a composite body containing this alloy, which is in particular suitable as electrical contact material.

This application forms a divisional application of my copending application Serial Number 40,302, filed September 12, 1935, for alloys, particularly adapted for electrical contacts and electrodes, and a continuation in part of my copending application Serial Number 30,151, filed July 6, 1935, for an alloy or compound material suitable as electric contact material.

Alloys adapted for electrical electrodes and contacts, or parts thereof, are to be made according to this previous suggestion of metal of the copper group and cadmium. The content of cadmium may amount from 0.1% to about 10%. This alloy can be used as such or as admixture or prealloy or may be added to other metal. As examples of metals alloying with the copper alloy to a certain extent, magnesium, beryllium, silver, gold may be mentioned. One or more of such metals may be added to the copper alloy preferably in amounts from about 0.1% to about 5% and more. As metals which substantially do not alloy with a copper alloy, tungsten, molybdenum and tantalum may be mentioned.

According to this invention, boron in amounts of about 0.1% to about 5%, calculated upon the basic copper alloy, is added.

So, for instance, an alloy according to this invention may consist of 96.5% copper, 3% cadmium and 0.5% boron.

Another composition may consist of 94.7% copper, 4% silver, 1% cadmium and 0.3% boron.

Still another composition may consist of about 93.5% to 98.5% copper, about 0.3% to 5% boron, and silver and cadmium totaling about 1% to 6%, the silver amounting within that total to 1% to about 5.9% and the cadmium amounting within that total to 0.1% to about 5%.

An alloy of such or equivalent composition may either be shaped to form the surface portion of a contact, or electrode, e. g. of a switch or of a welding electrode. In general, the material according to this invention is advantageously used for any electrode, or portion thereof, subjected, as the case may be, to high electrical loads and mechanical pressure, or heavy strokes and being used under oxidizing conditions, such as in open air.

The boron comprising alloy may also contain other alloying metal referred to above such as silver, gold, and/or beryllium, aluminum, magnesium, tin, up to about 5% and more. Such a boron containing copper alloy may, however, also be added to other metals such as tungsten, molybdenum and tantalum, these metals amounting up to about 80% of the final composite body which may then be shaped to form the desired contact or electrode, or part thereof.

The material according to the invention proves of great hardness and resistance to mechanical deformation, also under strenuous operating conditions. In particular, such material may be used for contacts of welding needing very quick opening and closing, or for welding electrodes carrying high current and being pressed on the workpiece. They do not get warm either to an undesirable degree during operation.

By the addition of boron particularly a finer crystalline structure may be obtained. Furthermore any arc originating between such contacts while in operation, extinguishes quicker under an apparent deionizing action of the contact material. The surface of the contact remains smooth during a longer time of operation than the known ones, obviously due to the fact that the boron present prevents sticking of copper oxides, if formed, to the surface of the contact. The small addition of boron prolongs, also, the life of contacts containing cadmium without reducing their electrical conductivity.

It is to be understood that the invention is not restricted to any particular use referred to herein, but may be used for any other electrical purpose and parts of electrical devices.

What I claim is:

1. An alloy, particularly adapted for electrical purposes and as prealloy for electrical material, consisting of 94.7% copper, 4% silver, 1% cadmium and 0.3% boron.

2. An electrical contact or welding electrode the surface layer of which is exposed to arcing, consisting of about 93.5% to about 98.5% copper, about 0.3% to 5% boron, about 1% to 5.9% silver and about 0.1% to 5% cadmium, the total of said silver and cadmium not exceeding about 6%.

3. An alloy resistive to mechanical wear and oxidation, particularly adapted for electrical purposes including contacts and welding electrodes and as a pre-alloy for electrical material, consisting of about 0.1% to about 5% boron, about 0.1% to 10% cadmium, about 80% to about 98.5% copper and about 0.1% to about 6% silver.

HANS HEINRICH SCHWARZKOPF.